No. 755,066. PATENTED MAR. 22, 1904.
W. R. SMITH.
POWER TRANSMITTING DEVICE.
APPLICATION FILED JULY 18, 1903.
NO MODEL. 2 SHEETS—SHEET 2.
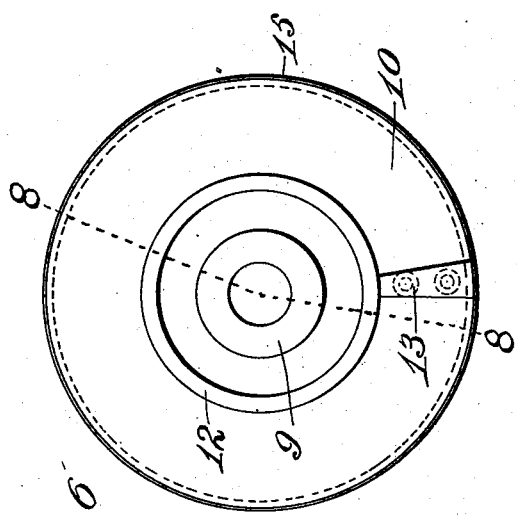
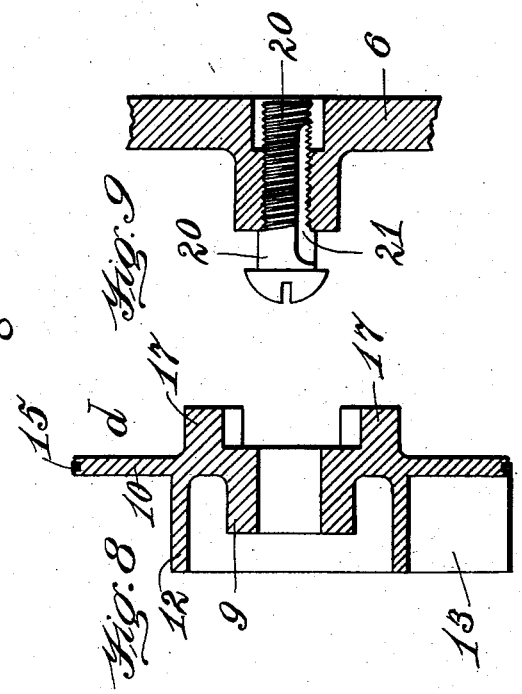
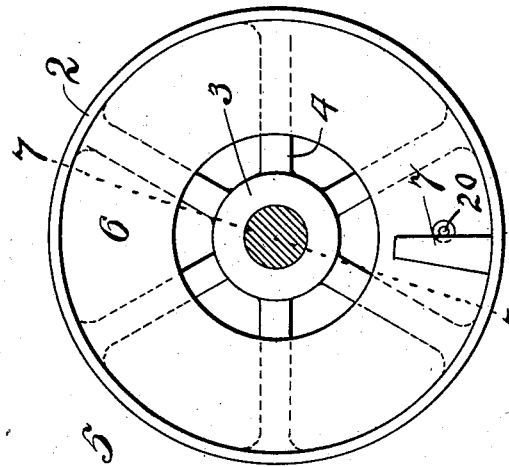
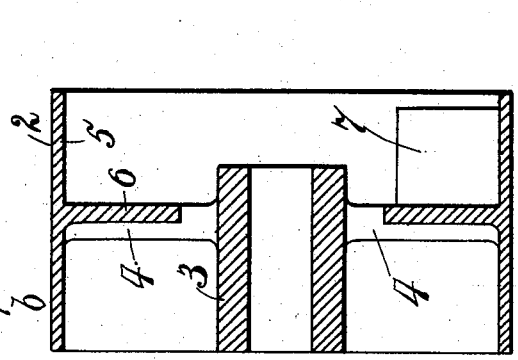
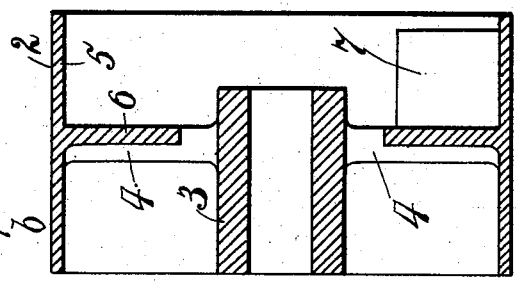
Witnesses:
Peter W. Pozzetti.
Evroy P. Lucca.
Inventor:
William R. Smith
By Wright, Brown & Quinby
Attys No. 755,066. Patented March 22, 1904.

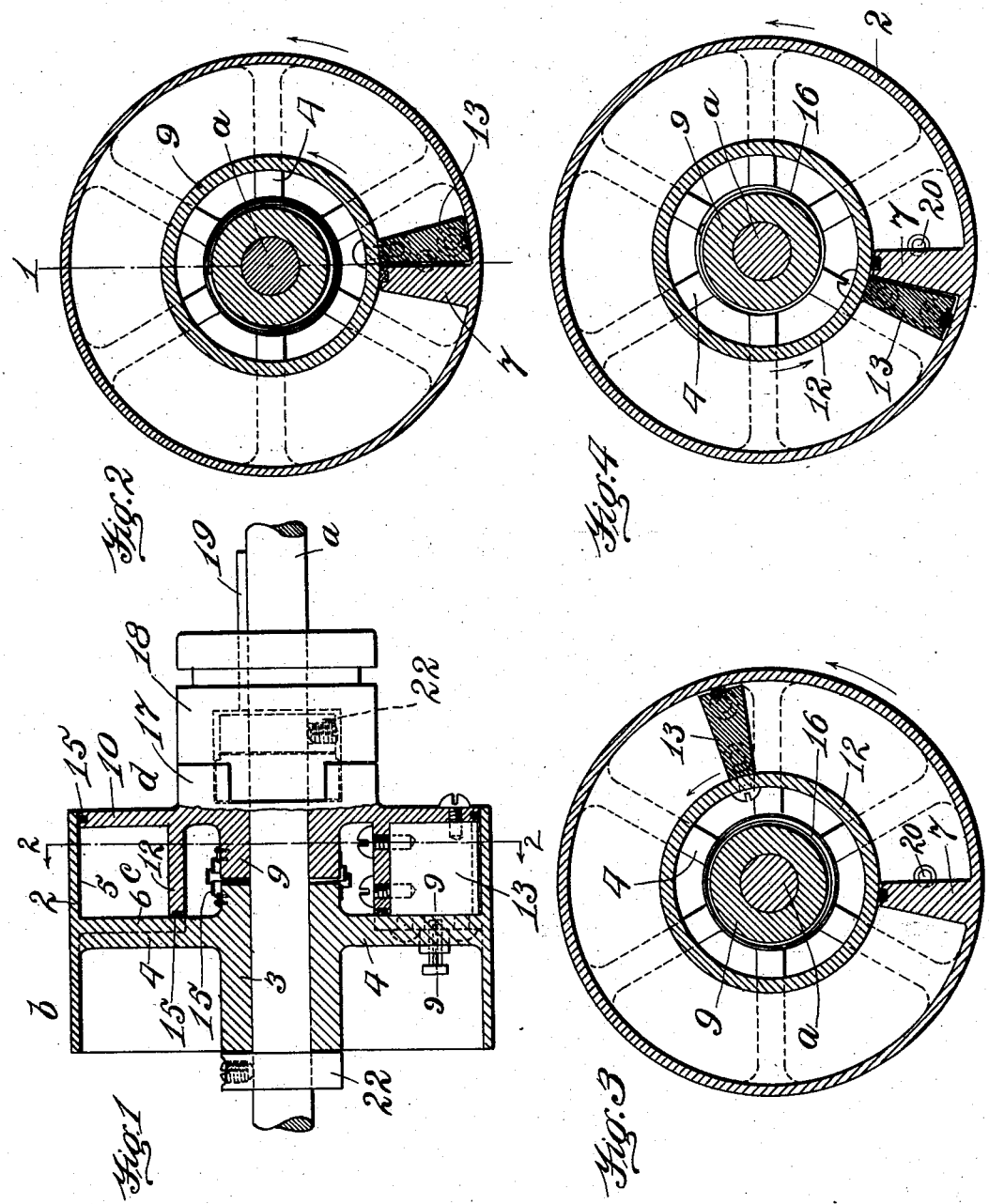

UNITED STATES PATENT OFFICE.

WILLIAM R. SMITH, OF BUFFALO, NEW YORK.

POWER-TRANSMITTING DEVICE.

SPECIFICATION forming part of Letters Patent No. 755,066, dated March 22, 1904.

Application filed July 18, 1903. Serial No. 166,120. (No model.)

*To all whom it may concern:*

Be it known that I, WILLIAM R. SMITH, of Buffalo, in the county of Erie and State of New York, have invented certain new and useful Improvements in Power-Transmitting Devices, of which the following is a specification.

This invention has for its object to provide a simple and efficient means for yieldingly connecting two members of a power-transmitting device, such as a driving-pulley and the shaft upon which the pulley is mounted, in such manner as to prevent a severe shock on the mechanism when the members are positively connected, it being my object to enable the connection of the said members to be graduated by an air-cushion, which is compressed by the connection of the members and establishes a yielding connection between the two until time is afforded for the speed of the driven member to approximate that of the driving member before a positive connection is established between the two members.

The invention consists in the improvements which I will now proceed to describe and claim.

Of the accompanying drawings, forming a part of this specification, Figure 1 represents a sectional elevation of a power-transmitting device embodying my invention. Fig. 2 represents a section on line 2 2 of Fig. 1. Figs. 3 and 4 represent views similar to Fig. 2, showing the parts in different positions. Figs. 5 and 6 represent side views of the two principal parts or sections of the device shown in Figs. 1, 2, 3, and 4. Fig. 7 represents a section on line 7 7 of Fig. 5. Fig. 8 represents a section on line 8 8 of Fig. 6. Fig. 9 represents a section on line 9 9 of Fig. 1.

The same reference characters indicate the same parts in all the figures.

In the drawings, $a$ represents a shaft to which rotary motion is to be applied.

$b$ represents a part or section of my improved power-transmitting mechanism, the said section $b$ being formed in this embodiment of my invention as a pulley mounted loosely on the shaft $a$ and provided with a power-receiving portion, here shown as a rim 2, adapted to support a driving-belt, and a hub 3, bearing on the shaft $a$. The rim 2 is connected with the hub by any suitable connecting devices, which may consist of spokes 4. A portion of the rim 2 projects from one side of the line of spokes 4, its inner surface 5 constituting the outer wall of a segmental air-chamber $c$.

6 represents a web which projects inwardly from the rim 2 and is or may be cast with the spokes 4, said web forming one side of the air-chamber $c$.

7 represents a head or abutment which is affixed to the web 6 and to the portion of the rim having the surface 5, said head being preferably secured by means of screws 8, as indicated by dotted lines in Fig. 1, although, if desired, it may be cast integral with the web and rim. The head 7 extends across that portion of the rim which forms the outer side of the air-chamber, the said head constituting one end of the air-chamber.

$d$ represents another part or section of my improved power-transmitting device. The section $d$ comprises a hub 9, which bears loosely upon the shaft $a$ beside the hub 3, a web 10, which projects outwardly from the hub, its outer margin bearing against the inner surface of the rim 2, and an annular rim or flange 12, which projects from one side of the web 10 and bears upon the inner portion of the web 6. The portion of the web 10 which projects outwardly from the flange 12 constitutes one of the sides of the air-chamber $c$, while the flange 12 constitutes the inner side of said air-chamber.

It will be seen from the foregoing that the rim 2, the webs 6 and 10, and the flange 12 constitute the longitudinal walls of a continuous annular chamber. The continuity of said chamber is interrupted by the head 7, which, as already stated, constitutes one end of the air-chamber, and by a similar head 13, which is affixed, preferably by screws 14, to the web 10 and flange 12 of the section $d$.

The sections $b$ and $d$ are rotatable independently of each other, the outer edges of the web 10 and flange 12 being in rubbing contact, respectively, with the rim 2 and web 6. The joint formed by said edges is preferably made approximately air-tight by means of packing-strips 15 15, inserted in grooves in the heads of the webs 10 and flange 12, said packing-strips being of any suitable compressible material, either metallic or non-metallic.

16 represents a spring which is attached at its ends to the hubs 3 and 9 and is arranged so that it normally holds the two sections above described in the position shown in Fig. 2, the backs of the heads or abutments 7 and 13 being in contact with each other, so that the air-chamber $c$ is extended to its maximum length.

The section $d$ is provided with a clutch member, here shown as clutching ears or wings 17 17, formed on and projecting outwardly from the web 10.

18 represents a complemental clutch member which is adapted to slide upon the shaft $a$ and is rotatively engaged therewith by means of a spline 19, the said clutch member 18 being formed to engage the clutch member 17 when moved toward the latter by a suitable shifting device. (Not shown.)

When the clutch members 17 and 18 are disengaged, the sections $b$ and $d$ rotate loosely upon the shaft $a$, said sections being held by the spring 16 in the relative positions shown in Fig. 2, the air-chamber, as above stated, being extended to its maximum length. When the clutch member 18 is moved into engagement with the clutch member 17, the rotary movement of the section $d$ is arrested or retarded, so that the head or abutment 7 on the constantly-moving section $b$ moves away from the head or abutment 13 on the section $d$, as indicated in Fig. 3, thus shortening the air-chamber and causing the compression of the air therein. The air-cushion thus formed acts to yieldingly impart motion from the section $b$ to the section $d$ and to the shaft $a$, the rapidity of the movement thus imparted increasing with the compression of the air, but being in all cases gradual or free from sudden shock. The compression of the air continues until a sufficient quantity escapes to permit the head 7 to overtake the head 13, as indicated in Fig. 4, so that the head 7 is positively engaged with the head 13 and imparts positive movement to the section $d$ and shaft $a$. The escape of air from the air-chamber while the air is under compression, as above described, may be through a vent 20, which may be adjustable to regulate the rapidity of the escape. The said vent is preferably a screw inserted in a tapped orifice in the web 6 and having an air-passage 21 extending from the head nearly to the inner end of the screw, said inner end being surrounded by a countersunk cavity formed in one surface of the web 6. By adjusting the screw so that more or less of the air-passage projects into the cavity the escape of air from the air-chamber may be regulated.

22 22 represent collars which are affixed to the shaft $a$ to prevent endwise displacement of the sections $b$ and $d$.

It will be seen that while the starting of the driven part or member is gradual and free from shock its engagement with the driving member is positive after the full load has been taken up, so that there is no possibility of slip between the driving and driven members.

I do not limit myself to the form and construction of the essential parts here shown, as the same may be variously modified without departing from the spirit of my invention. It is obvious that the power-receiving portion of the section $b$ may constitute the toothed periphery of a gear-wheel instead of being formed to engage a driving-belt, or power may be imparted to the driving member in any other suitable way.

I claim—

1. A power-transmitting device comprising a plurality of rotatable sections collectively forming a contractible air-chamber, and means carried by one section to limit the independent rotation of the other section to contract the chamber and form a cushion of compressed air therein.

2. A power-transmitting device comprising a plurality of rotatable sections collectively forming a contractible air-chamber, and means carried by one section to limit the independent rotation of the other section said chamber having a restricted air vent or outlet to permit the gradual escape of air from said chamber.

3. A power-transmitting device comprising two rotary sections collectively forming a contractible air-chamber, said sections having heads or abutments which compress the air in said chamber and meet to positively engage the sections.

4. A power-transmitting device comprising two rotatable sections collectively forming a contractible air-chamber, one section carrying means to limit independent rotary movement of the other, one of said sections having a power-receiving portion and the other a clutch member, and a complemental clutch member movable into and out of engagement with the first-mentioned clutch member.

5. A power-transmitting device comprising two rotary sections collectively forming a contractible air-chamber, said sections having air-compressing heads or abutments forming opposed ends of the air-chamber, and means for yieldingly holding said sections in position to extend the air-chamber.

6. A power-transmitting device comprising, first, a section having a hub, a rim concentric with the hub, a web projecting inwardly from the rim, and a head or abutment extending crosswise of the rim; secondly, another section having a hub, a web projecting outwardly therefrom, an annular flange projecting from one side of the web, a head or abutment extending crosswise of the annular flange, and a clutch member projecting from the opposite side of the web, said rim, webs, annular flange, and abutments forming a segmental compressible air-chamber of which the abutments are the ends, a spring connecting the two sections and yieldingly holding them in position to extend the air-chamber; thirdly, a shaft on which the hubs of said sections are loosely rotatable; and fourthly, a clutch member rotatively engaged with the shaft and movable into and out of engagement with the first-mentioned clutch member.

In testimony whereof I have affixed my signature in presence of two witnesses.

WILLIAM R. SMITH.

Witnesses:
　Thos. H. Noonan,
　Charles J. Staples.